Oct. 14, 1952         N. C. PRICE         2,613,501
INTERNAL-COMBUSTION TURBINE POWER PLANT
Filed June 2, 1945         6 Sheets—Sheet 1
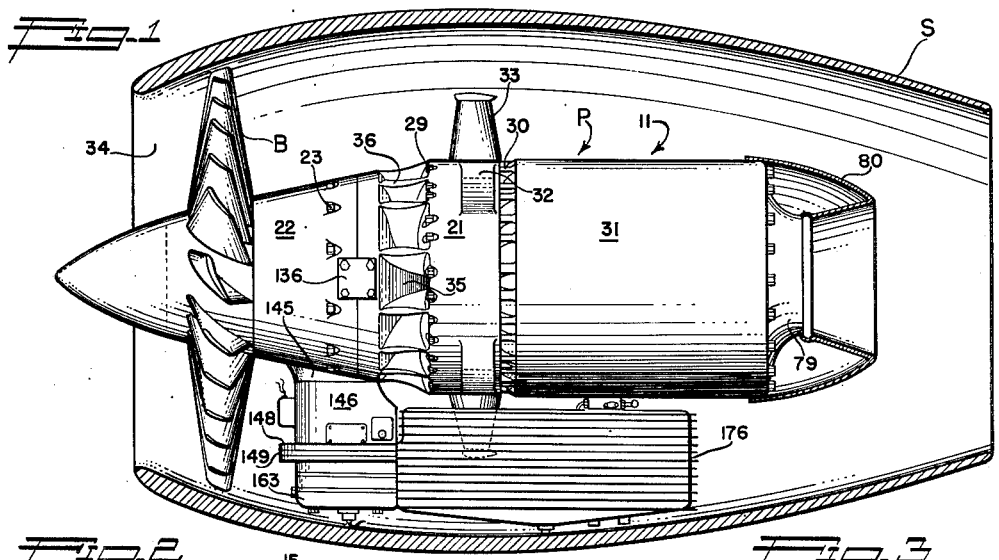
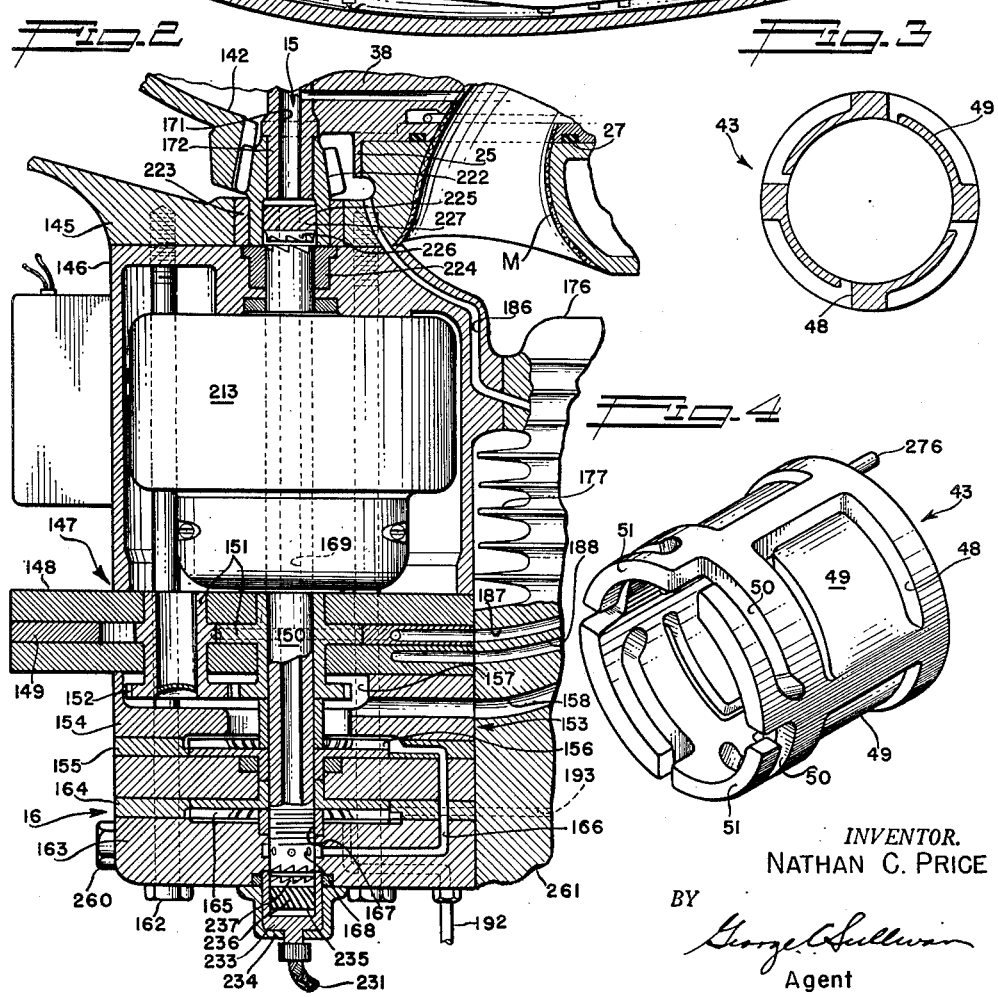
INVENTOR.
NATHAN C. PRICE
BY
George C. Sullivan
Agent

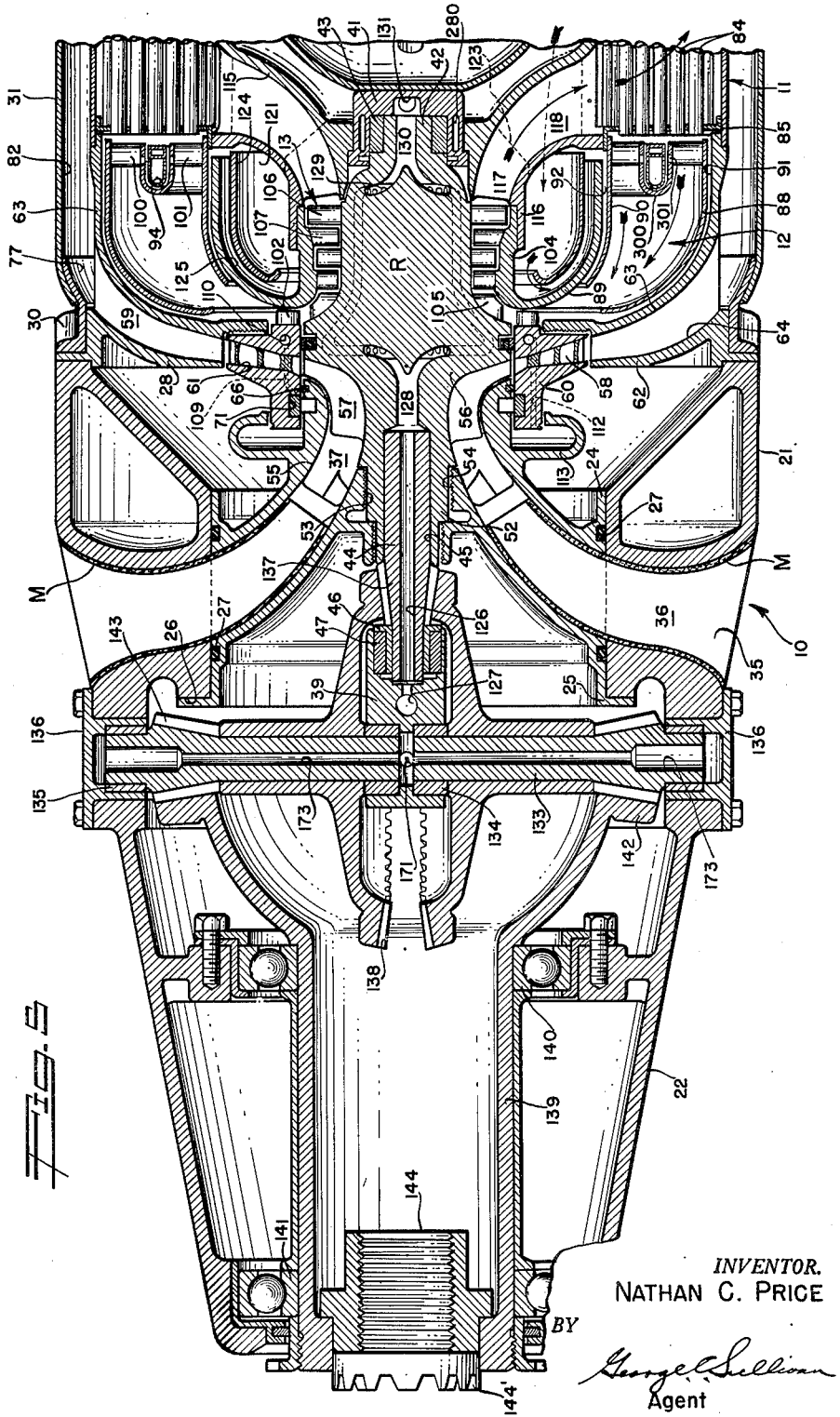

Oct. 14, 1952 N. C. PRICE 2,613,501
INTERNAL-COMBUSTION TURBINE POWER PLANT
Filed June 2, 1945 6 Sheets-Sheet 3
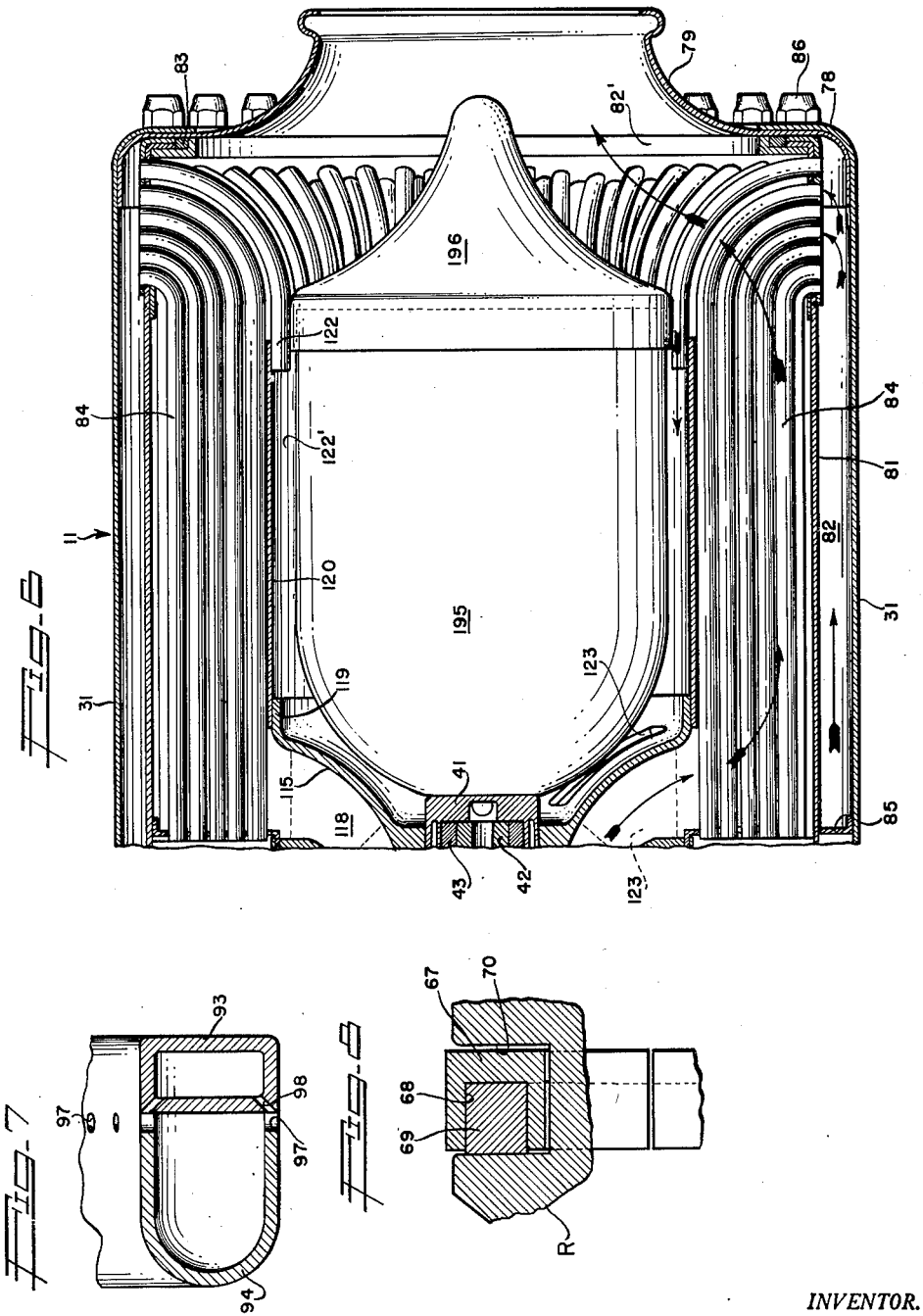
INVENTOR.
NATHAN C. PRICE
BY George Sullivan
Agent

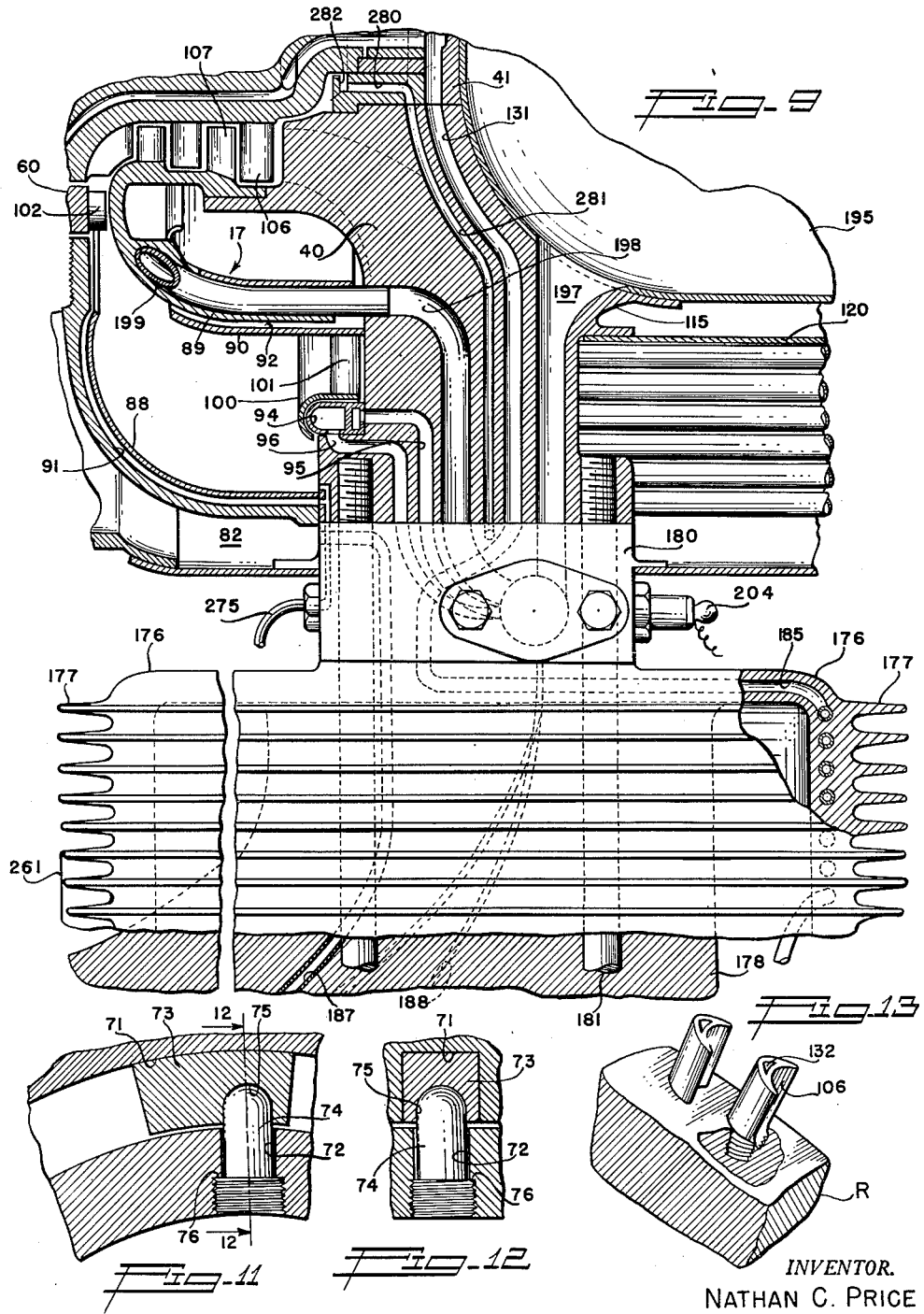

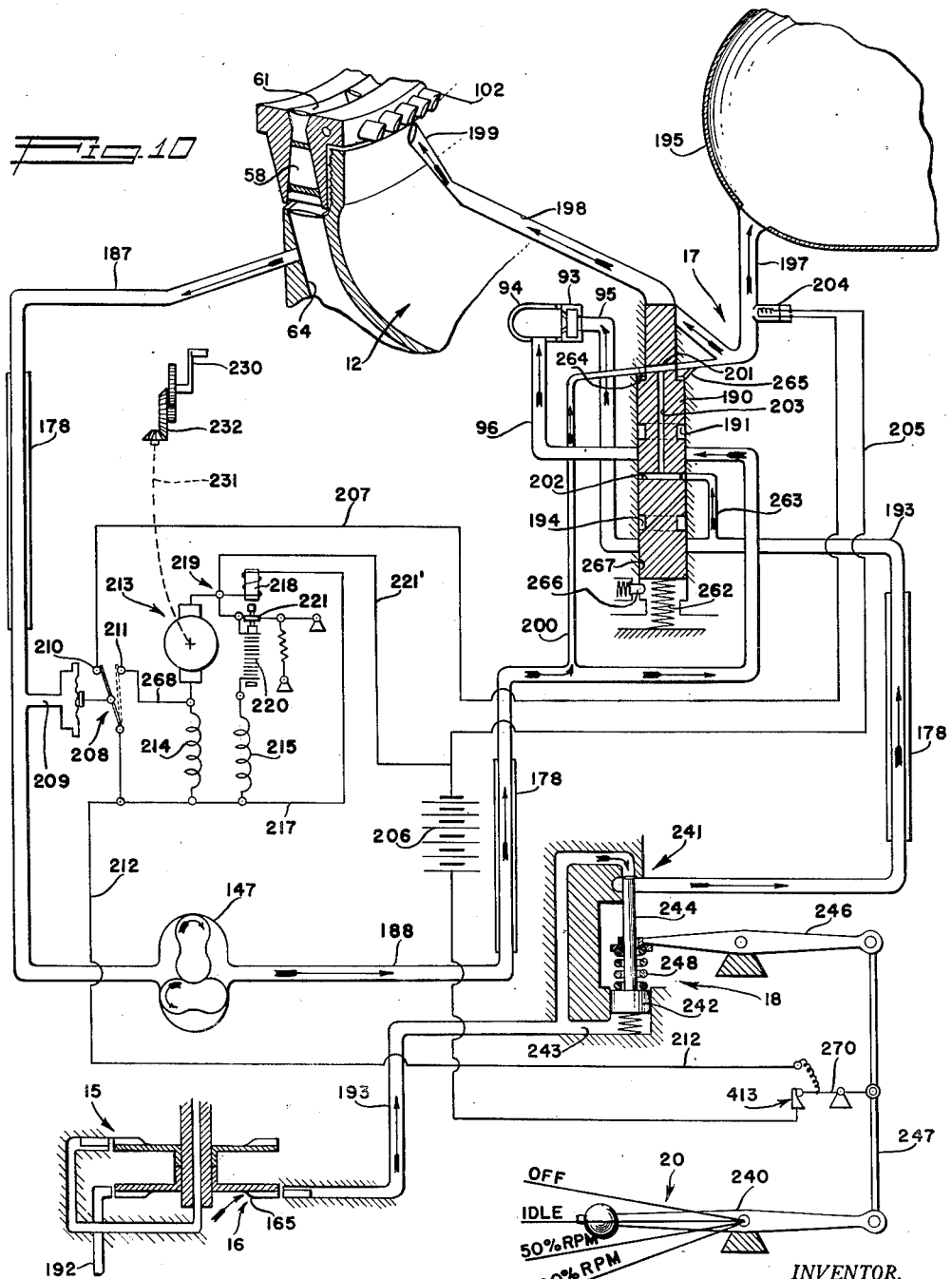

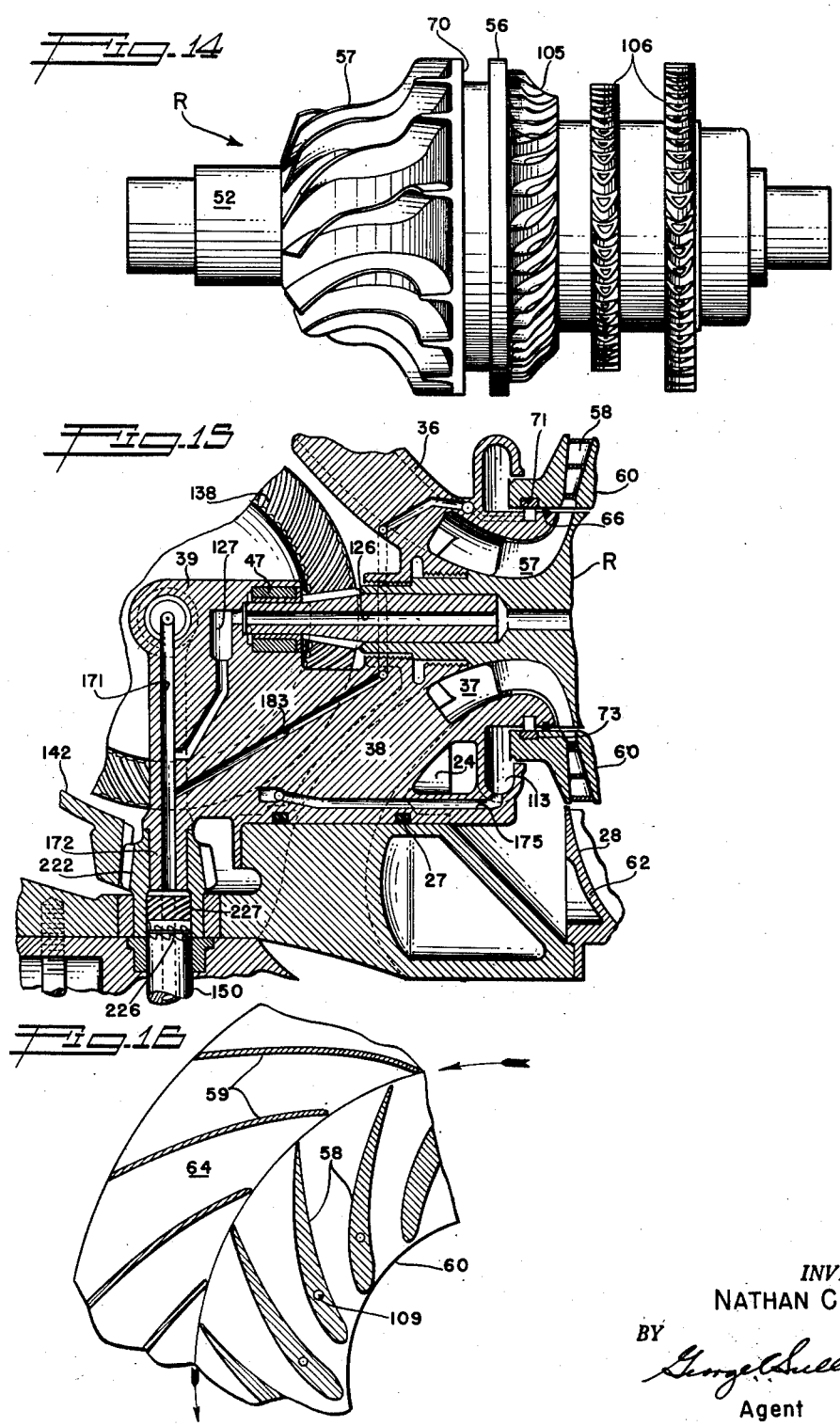

Patented Oct. 14, 1952

2,613,501

UNITED STATES PATENT OFFICE 2,613,501

INTERNAL-COMBUSTION TURBINE POWER PLANT

Nathan C. Price, Hollywood, Calif., assignor to Lockheed Aircraft Corporation, Burbank, Calif.

Application June 2, 1945, Serial No. 597,308

15 Claims. (Cl. 60—39.51)

This invention relates to prime movers, and relates more particularly to internal combustion gas turbines. It is a general object of the present invention to provide an internal combustion gas turbine structure especially adapted for, although not restricted to, embodiment in relatively small power plants having a wide range of application.

The present invention is suitable for embodiment in gas turbines for driving the propellers and rotors of small and medium small aircraft, as an auxiliary power plant for larger aircraft, for the starting of power plant units, as the driving engine of land vehicles and small vessels, and as a general purpose stationary and portable power plant. Although minor modifications may be necessary or desirable for certain adaptations, the characteristics of the turbine mechanism of the invention give it substantially universal applicability in the field of small and relatively small power plants.

The internal combustion gas turbines heretofore introduced and suggested, have either been designed for specific purposes or for employment in limited fields, and the design and operating characteristics have restricted their range of utility. Initial cost is an important factor in general utility power plants, and for the most part, the gas turbines heretofore proposed have been prohibitively expensive for general usage. Weight and size of the power plant are also of importance, particularly in the case of power plants for land, air and marine vehicles. Another factor essential to the all-around applicability of power plants that has not been adequately provided for in the internal combustion gas turbine field is the inclusion of accessories and controls. To adapt the power plant for general utility, it should embody a starting system, a lubricating system, an ignition system and a conveniently operable control, all contained in or forming integral parts of the power plant. In other words, the plant should be a complete self-contained unit, suitable for immediate installation without the necessity of obtaining and installing auxiliary or secondary equipment.

It is, therefore, an important object of this invention to provide a small, compact internal combustion gas turbine power plant that is inexpensive to manufacture and operate, and which constitutes a complete self-contained unit. The power plant of the invention is small, light in weight and of a configuration which readily adapts it for installation in practically any situation. The power output is exceptionally high when considered in relation to the weight and overall dimensions, and the construction of the plant assures a high efficiency of operation. The unit is complete in itself, including a starting system and ignition system, a lubricating system, a fuel injection system, a simple control and speed governor, and an auxiliary electric generator.

Another object of the invention is to provide a power plant of the character referred to embodying a single rotor carrying a row of compressor vanes and a series of rows of gas turbine buckets, the single rotor operating in conjunction with a counter-rotating compressor-turbine ring provided with compressor vanes which co-operate with rotating impeller blading and with stationary diffuser blading to effect a high compression ratio, and thereby bring about highly efficient operation. The floating ring is driven by a row of reaction turbine blading operating in the discharge throat of the combustion chamber, which blading absorbs only a minor proportion of the energy from the expanding air and gases of combustion. The counter-rotating turbine blading in the throat or nozzle of the combustion chamber eliminates the necessity for a nozzle ring at the entrance to the expansion zone of the gas turbine proper.

It is another object of the invention to provide an internal combustion gas turbine power plant unit in which the compressor-turbine rotor is internally cooled by the flow of lubricating oil and externally cooled by air flow. A multiplicity of passages in the peripheral portion of the rotor circulate the lubricating oil at a substantial velocity to carry away the heat from the turbine portion of the rotor while the rear bearing part of the rotor is cooled by the oil flow and by the flow of cooling air through an internal annular chamber of the bearing. Heat is conducted away from the compressor portion of the rotor wheel by the air handled by the compressor as well as by the internal lubricating oil flow. The transference of heat to the rapidly moving oil in the multiplicity of peripheral passages and to the flowing air, prevents overheating of the rotor and turbine blading and the disposition of the passages is such that the highly stressed central portion of the rotor may be left solid.

It is another object of the invention to provide a power plant of the class referred to characterized by a compact and advantageous relationship of elements effecting a saving of weight and material and increasing the all around efficiency of the plant. The floating counter-rotating compressor-turbine ring is in surrounding relation to the principal compressor-turbine rotor to have its diffuser blading interposed between and in concentric relation to the compressor blading of the rotor and the stationary diffusers, and the combustion chamber is in turn in spaced surrounding relationship to the rotor, and is arranged to have its discharge throat directed radially inwardly at an end of the floating ring so that the gases of combustion act upon the turbine buckets of the floating ring before entering the expansion zone of the turbine. Efficiency is further increased, and size and weight are reduced by arranging the regenerator or heat exchanger within the main air flow channel from the compressor and in a position to receive the gaseous discharge from the turbine, the air storage tank for the starting system being within a space defined by the tubular heat exchanger, thereby utilizing this otherwise unoccupied space. The advantageous relationship of power plant elements facilitates the employment of parts and elements of particularly effective construction and operation. For example, the annular combustion chamber may have a major cylindrical portion receiving the preheated compressed air from the heat exchanger and a forward portion of inwardly diminishing capacity curving inwardly to discharge radially into the turbine, the configuration of the chamber reducing turbulence to a minimum.

A further object of the invention is to provide a power plant of the character referred to above, embodying a starting system which utilizes the air compressor and fuel pump of the fuel injecting system to supply air and fuel under pressure to an accumulator tank with an automatic sequence control for governing the igniting and delivery of the air and fuel mixture from the tank to a starting nozzle which directs the air and combustion gases against the buckets of the floating ring to spin the counter-rotating diffuser blades. A motor-generator energized by a battery current, initially drives the air compressor of the fuel injection system to supply the air pressure to the accumulator tank, and also drives the lubricating pump and the fuel pump to prelubricate the various bearings of the power plant and to build up fuel pressure. The sequence control provides for the correctly related or timed operation of the air starting valve, the diversion of the air pressure and fuel to the fuel injecting ring, and the energization of the fuel igniting glow plug to initiate power plant operation. The starter motor and auxiliary generator, the fuel and oil pumps and other accessories are incorporated in a compact assembly removably secured to the housing of the main plant unit for convenient installation, servicing and replacement.

A further object of the invention is to provide a power plant of the class referred to wherein the speed of operation is governed by the pressure developed by a special fuel pump having substantially flat-curve operating characteristics. The discharge pressure of the fuel pump varies approximately in accordance with the square of the turbine speed irrespective of fuel flow rate change accompanying change of altitude. The manual control is operable to adjust a spring pressure being exerted against a discharge-pressure-operated throttle valve at the discharge side of the fuel pump. By selected adjustment or operation of the manual control, a constant speed setting is obtained which is substantially unaffected by altitude, load or other external conditions. The employment of fuel pressure as a governing medium or factor imparts a positive safety feature because a failure of the fuel supply or fuel pressure will result in a reduction of power plant speed and cannot cause overspeeding, which might result from the failure of a governor system or means of a different type.

Other objectives and features of the invention will become apparent from the following detailed description of a typical preferred embodiment of the invention illustrated in the accompanying drawings in which:

Figure 1 is a side elevation of a power plant of this invention arranged in an enclosing shroud, the shroud appearing in longitudinal cross section;

Figure 2 is an enlarged fragmentary vertical section of the auxiliary unit and adjacent parts of the power plant;

Figure 3 is an enlarged transverse cross sectional view of one of the bearings;

Figure 4 is a perspective view of the bearing illustrated in Figure 3;

Figure 5 is an enlarged horizontal cross sectional view of the forward major portion of the power plant;

Figure 6 is an enlarged cross sectional view of the rear portion of the power plant taken in a horizontal plane;

Figure 7 is an enlarged fragmentary cross sectional view of the fuel injecting ring assembly;

Figure 8 is an enlarged fragmentary sectional view of a sealing means associated with the rotor;

Figure 9 is a fragmentary vertical sectional view of a portion of the power plant with certain parts appearing in side elevation;

Figure 10 is a schematic diagram of the starting means, the fuel injecting system, the speed control, and associated parts;

Figure 11 is an enlarged fragmentary detailed sectional view illustrating the bearing means of the counter-rotating ring;

Figure 12 is a transverse detailed sectional view of the bearing means shown in Figure 11 taken on line 12—12 on Figure 11;

Figure 13 is an enlarged fragmentary perspective view of buckets of the turbine illustrating the manner of anchoring the same;

Figure 14 is an elevation view of the compressor-turbine rotor of the power plant;

Figure 15 is a fragmentary vertical sectional view of a portion of the power plant illustrating certain of the lubricant passages; and Figure 16 is a diagrammatic view of a portion of the diffuser blading embodied in the compressor.

The power plant of this invention has a wide range of application, and is capable of variation and modification to adapt it for specific uses. In Figure 1, I have illustrated an installation primarily adapted for the propulsion of aircraft, and the like, and I will herein describe this embodiment and application, it being understood that such illustration and description is merely by way of example and is not to be taken as restricting the invention either as to scope or application.

The apparatus of this invention may be said to comprise generally the following primary elements: a tubular shroud S, and a power plant P in the shroud, including compressor means 10, a heat exchanger 11 receiving the compressed air from the compressor means, a combustion chamber 12, and turbine means 13 receiving the air and combustion gases from the chamber 12 and serving to drive the propeller blading B in the shroud S. The apparatus further includes a lubricant supply system 15, a fuel supply system 16, starting means 17, and a speed governing means 18.

The shroud or envelope S is not essential to the operation of the other elements of the apparatus, but is illustrated as an appurtenance to the power plant and its driven propeller blading B as employed in aircraft propulsion. The shroud S is an elongate tubular member of selected construction and material having an open rearwardly divergent forward end. The rear end of the shroud S is likewise open, but is rearwardly convergent for the discharge of the airstream from the propeller blading B, and the air and gases of combustion from the power plant to obtain a reaction propulsive effect, it being understood that the primary propulsive effect is obtained by the in-tube propeller blading B and the reactive propulsive thrust resulting from the discharge from the power plant is merely additive thereto. The envelope or shroud is designed to contain and support the power plant P and may be conveniently installed or embodied in the aircraft.

The power plant P embodies a housing assembly for containing the several aforementioned elements. This assembly includes an intermediate section 21 which is an annular or tubular member that may be constructed as a casting of dural, or the like. The rear portion of the housing section 21 presents a cylindrical external wall, while the forward portion of the section is frusto-conical, tapering forwardly and inwardly. A forward housing section 22 is secured to the forward end of the section 21 by circumferentially spaced cap screws or bolts 23 in such a manner that upon removing the bolts, the section 22 may be moved forwardly and detached to expose the interiors of the sections 21 and 22. A separately formed generally cylindrical member 24 is secured within the intermediate section 21, being entered into the forward end of the section to have a flange 25 engage against an abutment 26 on the section. Sealing rings 27 are engaged in axially spaced grooves in the periphery of the internal member 24 to seal with the interior of the intermediate casing section 21, it being understood that the member 24 is stationary with respect to the section 21. A third hollow or tubular casing section 28 is secured to the rear end of the intermediate section 21 by elongate screws or bolts 29 extending through axial openings in the wall of the intermediate section and threaded into bosses 30 on a clamp ring 77. Upon removing the bolts 29, the section 28 may be detached rearwardly to expose the internal parts. In addition to the housing sections just described, the casing assembly includes an elongate tubular shell 31 of stainless steel, or the like, attached to the ring 77 and extending rearwardly therefrom to enclose the regenerator 11, as will be hereinafter described.

The power plant P may be mounted in the tubular shroud S in any selected or appropriate manner. In Figure 1, I have shown circumferentially spaced lugs 32 projecting from the intermediate housing section 21 and supporting arms 33 secured to the lugs to project to the wall of the shroud S. The arms 33 are suitably fixed to the shroud S and are preferably streamlined in transverse cross section. The power plant P is concentrically disposed within the shroud S and is spaced from its wall to leave an annular air passage 34 of substantial capacity.

The compressor means 10 includes a multiplicity of circumferentially spaced inlet ducts or passages 35 extending inwardly and rearwardly through the wall of the intermediate casing section 21 and its internal member 24. The air passages 35 are spaced apart and defined by guide vanes 36, which are preferably airfoil shaped in transverse cross section. As best illustrated in Figure 5, the inlet passages 35 gradually diminish in capacity in a rearward direction and an annular compressor chamber 37 is provided in the member 24 at the rear ends of the passages. Acoustical insulating material M such as cork and a binder, felted material, or felt, is provided on the walls of the forward portions of the induction passages 35 to reduce to a minimum the undesirable sound frequently produced at the air induction openings of power plants of this class.

The compressor means 10 further includes a main or central rotor R and a surrounding counter-rotating ring 60, both carrying blading. In accordance with the invention, the rotor R is a combined compressor-turbine wheel carrying both compressor blading and turbine buckets. The rotor R is arranged coaxially within the housing assembly and is journaled at its opposite ends. The member 24 has an inwardly or upwardly extending substantially radial web 38 which carries an integral supporting boss or journal boss 39. A similar upwardly projecting web 40 is provided on a member 115 at the rear of the casing section 28 and carries a journal or bearing box 41. The rotor R is preferably a precision casting of chromium steel and the preferred method of fabricating the rotor will be later described. The rear end of the rotor R is provided with a reduced trunnion or axle 42 supported in the journal box 41 by a bearing 43. A shaft 44 is press fitted, or otherwise secured, in a central opening 45 in the forward end of the rotor R, and a journal bushing 46 is pressed onto the forward portion of the shaft. The rotor shaft 44 with its bushing 46 is supported in the socket of the boss 39 by a suitable bearing 47.

While any selected type of bearing may be employed to mount the rotor R, I prefer to utilize the segment type combination radial and axial thrust form of bearing illustrated in Figures 3 and 4. I have employed the reference numeral 43 to designate the bearing illustrated in Figures 3 and 4, it being understood that the following description of the bearing is also applicable to the bearing 47. The bearing 43 may be a silver-plated precision steel casting, although it may be practical to construct the bearing from sheet stock or tubing. The bearing is a tubular one-piece member provided with circumferentially spaced rectangular openings or windows 48. Flexible resilient tongues 49 project from the leading end walls of the openings 48 and extend circumferentially in a direction counter to the direction of rotation of the journaled part. The inner surfaces of the tongues 49 cooperate with the shaft or journaled member, but the tongues are of reduced thickness so that their outer surfaces are depressed relative to the external surface of the bearing. It will be understood how the rearwardly directed flexible resilient tongues 49 are effective in assuming the radial thrusts or loads, and maintain lubricant films at or between the journal and bearing surfaces. An end portion of the bearing 43 has a series of circumferentially spaced substantially L-shaped slots 50 defining flexible resilient tongues 51. The tongues 51 are each supported at one end only, and project from these anchored ends in the same direction as the tongues 49; that is, in a direction counter to the direction of rotation of the journaled part. The end-thrust-assuming tongues 51 present extensive end surfaces for cooperating with the thrust surface of the rotating part. The resilient fingers or tongues 51 adequately carry the end thrusts and provide for the retention of oil layers or films at or between the end thrust surfaces. A pin 276 projecting from the opposite end of the bearing holds the bearing against rotation.

The forward portion of the rotor R has stepped cylindrical parts 52 freely received in corresponding openings 53 in the above mentioned member 24; see Figure 5. It is preferred to provide labyrinth type seals 54 in the openings 53 to reduce the leakage of air under pressure into the interior of the section 21. These seals are located forwardly of the aforementioned compressor chamber 37.

The annular compressor chamber 37 is defined by a wall 55 of the casing member 24 and an external surface of the rotor R. These parts are shaped and related so that the chamber 37 extends in a rearward direction from the inner extremities of the vanes 35, and then curves substantially radially outward. As best illustrated in Figures 5 and 11, the rotor R has an intermediate portion 56 of increased external diameter, and the forward face of this enlarged part forms one wall of the outwardly extending portion of the compressor chamber 37. The compressor chamber 37 decreases in capacity in the direction of air flow, having a relatively small annular exit at the cylindrical peripheral surfaces of the member 24 and rotor portion 56. Impeller or compressor vanes 57 are provided on the rotor R for operation in the chamber 37. The vanes 57 extend along the root or hub portion of the rotor and continue along the forward face of the rotor enlargement 56 to its periphery. The tips or outer edges of the compressor vanes 57 conform to but have suitable clearance with the curved internal surface of the wall 55. As shown in Figure 14, the vanes 57 have curved forward portions and substantially axial rear portions with the rear extremities leaned or curved forwardly relative to the direction of rotation.

In addition to the set of compressor vanes 57 just described, the compressor means 10 includes a row of counter rotating diffuser blades 58 and a row of stationary diffuser vanes 59, all serving to effect a high compression ratio. The counter-rotating diffuser blades 58 are carried by the aforementioned ring 60 surrounding the cylindrical surfaces of the rotor R and the member 24. The diffuser vanes 58 are positioned in an annular passage 61 leading substantially radially through the ring 60, the passage extending from the exit of the compressor chamber 37 to the periphery of the ring. The entrance of the passage 61 is convergent, while the exit is outwardly divergent, the two passage portions joining at a restricted throat spaced a short distance from the entrance. The diffuser vanes 58 extend axially through the passage 61 to connect the opposite end portions of the ring 60 and are of streamlined or airfoil shape in cross section as best illustrated in Figure 16. It will be seen from this figure of the drawings that the diffuser vanes 58 are set at a substantial angle to the radial, and are formed and related to define substantially Venturi shaped air passages. These passages are relatively wide at their mouths, become restricted at the zones of greatest camber of the vanes, and then gradually flare or increase in capacity to the periphery of the ring 60. As will be later described, the ring 60 is driven by a row of reaction turbine buckets 102 in the throat of the combustion chamber 11 to rotate counter to the rotor R. There is a considerable differential in the speed of the rotor R and the ring 60. For example, the rotor R may have a tip speed of approximately 1300 feet per second, while the ring 60 may have a tip speed of about 700 feet per second.

The casing section 28 has a pair of spaced curved walls 62 and 63 defining an outlet or air discharge passage 64 for the compressor means. This passage 64 curves radially and rearwardly from the outlet of the diffuser passage 61 of the ring 60, and is of increasing capacity toward its rear end. A series of stationary diffuser vanes 59 is provided in the passage 64. The vanes 59 may be of sheet metal and are pitched in the opposite direction to the counter-rotating diffuser vanes 58. The rear wall 63 of the diffuser passage 64 overlies the rear side of the counter-rotating ring 60, and is provided with a labyrinth seal to minimize leakage between the passage 64 and the combustion chamber 12. The other wall 62 of the passage 64 may merely closely engage about the periphery of the counter-rotating ring 60, and a seal at this point is not required, as a minor leakage of air under pressure into sections 21 and 22 is not undesirable.

It is preferred to provide seals between the rotor R and the counter-rotating ring 60 at the opposite side of the passage 61. A simple sealing ring 66 set in a groove in the periphery of the rotor is all that is required forwardly of the passage 61, but it is important to provide a heat resistant sealing means rearwardly of the passage. As illustrated in detail in Figure 8, an annular groove 70 of square or rectangular transverse cross section is provided in the periphery of the rotor R to contain this seal means. The seal is made up of two parts, each of about 180° extent to facilitate assembly. Each part comprises a section 67 of "Invar" steel, or the like. The sections 67 are proportioned to conform to the groove 70 with suitable tolerance and are provided at their forward faces with channels 68. The channels or grooves 68 terminate adjacent the ends of the sections 67 and contain inserts 69 of carbon. The sections 67 are expanded or urged outwardly by centrifugal force to seal outwardly against the ring 60 while the carbon inserts 69 effectively seal axially against the wall of the groove 70 to prevent the leakage of the expanding gases from the turbine, and are substantially unaffected by the high temperatures.

Any selected type of bearing means may be provided for the counter-rotating ring 60, but I prefer to employ the three directional segmental bearings illustrated. An annular groove 71 is provided in the internal surface of the ring 60, and a series of spaced radial bores or openings 72 extends through the wall 55 from the chamber 37 to the peripheral surface of the wall. Referring now to Figures 11 and 12, it will be seen that the bearing means comprises segments 73 conforming generally to the groove 71. These blocks or segments 73 are capable of limited play or movement in the groove under the influence of axial and radial thrusts, and are anchored by means which permit such limited movement and thereby provide for the trapping and retention of layers and bodies of oil at the bearing surfaces. These anchoring means comprise pins 74 introduced outwardly through the openings 72 and provided with spherically curved outer ends for engaging in correspondingly shaped sockets 75 in the segments 73. The sockets 75 are in the trailing end portions of the segments 73 relative to the direction of rotation of the ring 60. Heads at the inner ends of the pins 74 are threaded in the openings 72 and bottom against shoulders 76 on the walls of the openings to assure retention of the bearing segments 73 without interfering with their freedom of movement. It will be seen that the bearing segments 73 are retained for substantially universal movement to various positions depending upon the load and thrust conditions, and when in these positions, layers or bodies of lubricant are received in the slight spaces between the surfaces of the floating segments and the walls of the groove 71. The means for supplying lubricant to the bearing will be subsequently described.

Summarizing the above detailed description, it will be seen that the compressor means 10 embodies the multiplicity of inlet passages 35 receiving air from the annular passage 34 of the shroud S and delivering it to the compressor chamber 37, the compressor blading 57 operating in the chamber 37, the diffuser vanes 58 of the counter-rotating ring 60, and the stationary diffuser vanes 59 in the annular compressor discharge passage 64.

The air under pressure supplied by the compressor means 10 passes through the regenerator or heat exchanger 11 to the combustion chamber 12. The heat exchanger 11 includes the above mentioned tubular shell 31 extending rearwardly from the casing ring 77. As above described the screws 29 pass through openings in a flange portion of the casing section 28 and thread into lugs 31 on the ring part 77 associated with the section. The forward end of the shell 31 is secured to the ring part 77 as by welding. The shell 31 may be a simple tubular cylindrical element of stainless steel, or the like. An inturned annular lip 78 is provided at the rear end of the shell, and a tubular discharge fitting 79 is engaged with the lip to extend rearwardly from the power plant. A suitable fairing or shroud 80 may continue rearwardly from the shell 31, and has an inner part engaged on a bead at the rear end of the fitting 79. A tubular partition 81 of Inconnel or other suitable material is arranged within a shell 31 in spaced concentric relation thereto, leaving an annular passage 42 which extends rearwardly from the above described discharge passage 64 of the compressor means 10. The forward end of the partition 81 is secured to the wall 63, while the rear end of the partition terminates in a flange at the flanged portion of the fitting 79. A ring 82' is arranged within the wall or partition 81, and carries studs 86 which serve to connect the lips or flanges of the fitting 79 and the partition 81. A suitable sealing ring 83 of asbestos, or the like, is provided between the ring 82' and the wall of the discharge fitting 79.

The heat exchanger 11 further includes an annular bundle of tubes 84 arranged axially within the partition 81. The tubes 84 may be formed of electric seam welded tubing, and their forward ends are secured in openings in a partition plate 85 arranged at the rear end of the above described wall 63. The rear portions of the tubes 84 curve outwardly and are engaged or secured in radial openings in the rear portion of the partition 81. This bending or curving of the tubes provides for an efficient gradual change in the direction of flow of the air under pressure, and the curved portions of the tubes 84 are in outwardly diverging relation to provide for the free exhaust of the turbine gases of combustion from the heat exchanger. The partition may be reinforced at the tube openings. It is preferred to arrange the tubes 84 in spaced concentric rows with the tubes of each row spaced apart circumferentially. This provides a compact arrangement and permits the free flow of the air under pressure and the free flow of the combustion gases from the turbine 13 around the several individual tubes. The air under pressure from the compressor means 10 flows rearwardly from the annular passage 82 and enters the rear ends of the tubes 84 to flow through the tubes to the combustion chamber 12. An exchange of heat between the discharge gases and air occurs during the flow of air through the passage 82 and the tubes 84, whereby the air is preheated as it flows to the combustion chamber, thus materially increasing the thermal efficiency of the power plant.

The combustion chamber 12 is an annular, or substantially annular zone located rearwardly of the counter-rotating ring 60 and the wall 63 of the compressor means 10, and is in surrounding relationship to the turbine means 13. As best seen in Figure 5, the above mentioned wall 63 which defines the rear wall of the air compressor discharge passage 64, extends rearwardly to the partition 85 of the heat exchanger 11. A second tubular wall 89 spaced some distance within the wall 63 is arranged in generally concentric relation thereto. The walls 63 and 89 may be connected with the web 40 of the section 115 and have substantially cylindrical rear portions. These two spaced walls define the combustion zone. The forward portions of the walls 63 and 89 curve forwardly and radially inward in convergent relation to define the gradually restricted throat of the combustion chamber.

A shroud 88 is spaced within the outer wall 63 and a similar shroud 90 is spaced outwardly from the inner wall 89. The shrouds are formed of heat resistant material, and are in spaced generally parallel relation to their respective walls 63 and 89 to leave cooling air passages 91 and 92 of substantially uniform capacity. The protective shrouds extend from adjacent the partition 85 forwardly to points well within the curved diminishing exit throat of the combustion chamber. A portion of the relatively cool air delivered by the tubes 84 flows forwardly through the cooling passage 91 and cooling air is supplied to the passage 92, as will be later described, to protect the partitions and the walls 63 and 89 against the high temperatures generated in the combustion chamber. The cooling air leaves the forward ends of the passages 91 and 92 to continue forwardly along the surfaces of the combustion chamber throat to form protective boundary layers thereon of relatively cool air.

As indicated by the arrows in Figure 5, the compressed preheated air from the heat exchanger tubes 84 flows forwardly into the combustion chamber for passage therethrough to the turbine 13. The combustion chamber embodies a harness ring or manifold shroud 300 for protecting rings which inject a liquid fuel and air mixture into the rear portion of the chamber. This shroud is a substantially circular structure having its ends anchored at the web 40 and is arranged to be substantially midway between the shrouds 88 and 90. Figure 7 of the drawings illustrates the fuel injecting rings on an enlarged scale where it will be seen that the injecting means includes a hollow rear ring section 93 of substantially rectangular cross section, and a forward hollow ring section 94 of generally rectangular cross section having a rounded forward wall. Elements of the fuel supply system 16, subsequently described, supply fuel and air under pressure to ports 95 and 96 in the web 40, which ports communicate with the interiors of the rings 93 and 94 respectively, as shown in Figure 9. The inner and outer walls of the ring 94 have rows of circumferentially spaced air orifices 97, which discharge through ports 301 in the shroud 300; and the walls of the fuel ring 93 have angular or diagonal orifices 98 joining the orifices 97. The orifices 98 discharge into the orifices 97 adjacent their outer ends, and the jets of fuel issuing therefrom are generally transverse with respect to the airstreams issuing from the orifices 97. With this relationship, the jets of fuel are sheared off as they issue from the ports 98 so that the fuel is thoroughly broken up and admixed with air for full uniform combustion as the mixture travels forwardly through the combustion chamber.

Means are preferably provided to impart a swirling or rotary motion to the air entering the combustion chamber from the heat exchanger tubes 84. This means comprises a series or row of swirl vanes 100 extending radially between the shroud 88 and the injection rings 93 and 94, and a similar row of vanes 101 extending between the injection rings and the shroud 99. The vanes 100 and 101 are formed and pitched to impart a swirling motion to the streams of air flowing at each side of the fuel injecting rings, and this motion of the air assists in bringing about a uniform distribution of the fuel and air mixture and in producing an effective flame stream.

As mentioned above, the counter-rotating ring 60 is driven or operated by a row of reaction type turbine blades 102. The blades 102 project axially from the rear end of the ring 60 to project into the constricted exit throat of the combustion chamber. The rear end surface of the ring 60 opposes the wall 89, and together therewith, forms the throat or nozzle which introduces the gases of combustion and heated air into the turbine 13 at a high velocity. The buckets 102 are proportioned so that their tips have only slight working clearance with the opposing wall 89. The buckets 102 arranged as described and illustrated, absorb only a small proportion of the energy of the gases and air in driving the ring 60, and their provision at the nozzle of the combustion chamber eliminates the necessity for providing a nozzle ring between the combustion chamber and the turbine expansion zone, thus reducing the manufacturing costs. The counter-rotating ring may be a precision casting of heat treatable chromium steel and is preferably fabricated in the same manner as the rotor R. The mode of forming the rotor R is described below.

Provision is made for lubricating the bearings of the combination compressor and turbine ring 60, and for internally cooling the ring. An annular passage 110 is provided in the ring 60 in adjacent relation to the buckets 102, and a series of ports 109 lead from the above described bearing groove 71 to the passage. An oil supply passage 183 is formed in the casing member 24 to conduct oil to the bearing groove 71, the lubricating system to be hereinafter described, delivering oil under pressure to the passage 183. A series of return or discharge ports 112 extends axially forward through the ring 60 from the annular cooling passage 110 and discharges into an annular trough 113 formed on the member 24. The ports 109 and 112 are substantially 180° apart and pass axially through blades 58 of the ring 60. A return passage 175 in the member 24 conveys the returning oil from the trough 113 to the general lubricating system, as will be later described. The trough 113 further serves to trap oil that leaks or passes forwardly between the counter-rotating ring 60 and the cylindrical surface of the member 24. It will be seen that the lubricating oil supplied to the passage and port system just described, effectively lubricates the bearings of the counter-rotating ring 60, and in addition, cools the portion of the ring which is subject to the high temperature gases acting on the blading 102 of the ring.

The turbine 13 includes the rear portion of the rotor R which presents a substantially cylindrical external surface. The rear face of the intermediate rotor enlargement 56 is curved to merge with the cylindrical rotor surface. The above described wall 89, which is a split precision casting, has a tubular portion 104 in surrounding relation to the cylindrical rotor part to constitute the turbine housing, and to leave or define the annular expansion zone of the turbine. This wall portion 104 presents a stepped rearwardly divergent internal surface so that the expansion zone of the turbine is of rearwardly increasing capacity. The forward end of the wall portion 104 curves in substantially concentric relation to the curved rear face of the rotor enlargement 56 to provide the expansion chamber of the rotor with a curved direction-changing entrance. A row of Francis type turbine blading 105 is provided on the rotor R to operate in this curved entrance, and to be acted upon by the expanding gases as they enter the expansion zone of the turbine after leaving the buckets 102 of the counter-rotating ring 60. The cylindrical portion of the rotor R is provided with several spaced rows of impulse type buckets 106, and the turbine casing wall 104 carries rows of intermediates or stator blades 107 standing between the adjacent rows of rotor blades 105 and 106. The stator blades 107 may be cast integrally with the casing wall 104. The axial flow velocity of the gases in the turbine will usually range from about 1500 feet per second to 2000 feet per second, and the rotor R will have a tip speed of about 1300 feet per second.

The structure includes a turbine discharge member 115 for directing the turbine discharge gases into the heat exchanger 11. This member 115 may be secured to or formed integrally with the web 40 and has an annular flange or sleeve 116 engaging around the rear portion of the turbine wall 104 to aid in supporting the same. An annular collector chamber 117 is formed in the member 115 at the rear end of the expansion zone of the turbine, and a plurality of spaced outwardly and rearwardly curved ducts 118 extends through the member to the heat exchanger 11. A cylindrical flange 119 is formed at the rear end of the member 115 and carries a rearwardly extending tube or shell 120, which constitutes the inner wall of the heat exchanger 11. The shell 120 is spaced within the tubular bundles of tubes 84. As indicated by the arrows in Figure 6, the gases of combustion from the turbine 12 pass through the ducts 118 and flow through the heat exchanger 11 for final discharge from the fitting 79.

As previously described, the shroud 88 is spaced from the combustion chamber wall 63 to leave a cooling air passage 91. The rear end of this passage is in communication with the open ends of the heat exchanger tubes 84, and a portion of the air from the tubes flows through the passage 91 to protect the shroud and the wall 63 against the effects of excessive temperatures. The walls 89 and 104 of the turbine casing define an annular air space or chamber 121 surrounding the turbine. A row of curved tubes 122 is arranged at the rear of the tube bundle 84 of the heat exchanger and extend from the annular compressed-air passage 82 to the interior of the inner shell 120. A portion of the air from the annular passage 82 flows through the series of tubes 122 and discharges therefrom into the passage 122' to travel forwardly therethrough into the chamber 121. The ducts 118 are spaced apart to leave openings 123 for admitting the cooling air to the chamber 121. The relatively cool air flows forwardly through the chamber 121 in heat exchange relation to the turbine wall 104. A baffle 124 is fixed to the web 40 and is arranged in spaced generally parallel relation to the combustion chamber wall 89 to leave a cooling air passage 125 which extends from the forward portion of the chamber 121 to a point beyond the rear end of the wall 89. The air flowing forwardly through the chamber 121 passes around the forward end of the baffle 124 to flow rearwardly through the cooling passage 125. Upon leaving the passage 125, the air flows into the cooling passage 92 between the wall 89 and the shroud 90, and continues forwardly through the passage 92 to discharge into the combustion chamber adjacent its exit. The air supplied to the chamber 121 by the tubes 122 and directed to flow as just described, cools the turbine casing walls, the combustion chamber wall 89 and shroud 90. As noted above, the streams of relatively cool air leaving the cooling passages 91 and 92, flow over the combustion chamber surfaces at its exit portion or nozzle to protect the same.

The compressor-turbine rotor R is constructed for effective cooling by the internal circulation of a coolant. In the form of the invention herein disclosed, the lubricating oil of the power plant forms the coolant for the rotor. A longitudinal opening 126 is provided in the shaft 44 at the forward end of the rotor R to conduct the oil from a passage 127 in the boss 39 to a central passage 128 in the forward hub or compressor portion of the rotor R; see Figure 5. The rear part of the passage 128 flares into an annular distributing space which supplies the coolant to a multiplicity of circumferentially spaced axial ducts 129. The ducts 129 are spaced inwardly from and follow, generally, the peripheral surface of the rotor R, extending radially from the passage 128 into the rotor enlargement 56, then curving rearwardly and inwardly in generally concentric relation to the curved rear face of the enlargement 56 and continuing rearwardly in parallel relationship to the cylindrical turbine portion of the rotor surface to a collector passage 130 in the rear journaled part of the rotor. The passage 130 communicates with a return passage 131, which extends downwardly through the journal block 41 and the web 40 to return the oil to the lubricating system as will be more fully described.

The lubricant is supplied to the passage 128 under substantial pressure and flows through the multiplicity of ducts 129 at a high velocity. The rapidly flowing oil in the series of closely spaced ducts 129 effectively carries heat away from the peripheral zone of the turbine portion of the rotor R and the buckets 105 and 106 carried thereby. It will be observed that this mode of cooling the rotor R allows the central highly stressed part of the rotor to remain solid and imperforate, and reduces the metal in the peripheral parts of the rotor to lessen the centrifugal effects. The oil traveling through the journal portion 42 and the block 41 aids in cooling these parts.

It is desirable to internally cool the journal block 41 which carries the rear rotor bearing 43. In Figure 9 I have shown an internal annular passage 280 in the block 41 and a cooling air passage 281 extending downwardly through the web 40 and block 180 from the passage 280 to the discharge passage 82 of the compressor means 10. An annular air-seal groove 282 is provided in the block 41 to surround the rotor R, and has communication with the cooling passage 280 to receive air under pressure therefrom. The air under pressure in the groove 282 prevents the combustion gases in the expansion zone of the turbine from entering the journal block 41 where it would contaminate the lubricant in the bearing 43. The air under pressure supplied to the cavity or passage 280 by the duct 281 cools the block 41 and bearing 43, and continuously bleeds away from the seal groove 282 during power plant operation.

The internally cooled compressor-turbine rotor R is preferably, though not necessarily, produced in the following manner. The turbine buckets 105 and 106 are separately formed members of precision cast cobalt-alloy or sintered tantalum chromium plated parts. The roots of the buckets are preferably serrated or grooved as shown in Figure 13, and the tip portions of the buckets have weight reducing cavities 132. The buckets 105 and 106 are placed in a wax injection mold in the correct relationship to one another, and cores of refractory material are set in the mold to provide for the cooling passages 128 and 130 and the ducts 129. If preferred, steel tubes may be employed in place of the refractory core. Wax is then injected into the mold and when it has hardened the resultant wax compressor-turbine wheel carrying the buckets is removed from the mold. The wax unit is then provided with a coating of refractory plaster by placing the wax wheel in a container and pouring a liquid chemically hardening refractory plaster mix into the container to cover or immerse the wax unit. Upon hardening of the plaster, the wax is melted by the use of steam, or other means, and is poured from the plaster form. The plaster form of mold carrying the imbedded buckets and the core or steel tubes as the case may be, is raised to a temperature of about 2100 degrees Fahrenheit in a neutral atmosphere and molten heat treatable chromium steel is injected into the cavity of the mold. When steel tubes are employed as the core elements, cooling air is circulated through them during and following the injection of the molten steel to cool the tubes. The molten steel welds itself to the white hot roots of the buckets 105 and 106, which project from the plaster mold. When the casting has cooled, the plaster mold is broken away and the refractory core, when employed, is removed. The casting is then heated to approximately 1800° Fahrenheit in a neutral atmosphere, and oil quenched and drawn at 900° Fahrenheit. The external surfaces of the casting are then ground as required. The counter-rotating compressor turbine ring 60 may be constructed in substantially the same way as the rotor R.

The character of the transmission employed to transmit power from the rotor R to the driven part, will of course, depend upon the intended installation and application of the power plant. In the form of the invention illustrated, the speed reducing drive from the turbine to the propeller blading B is contained principally in the forward casing section 22. The gearing includes two axially aligned cross shafts 133 having a common axis normal to and spaced forwardly from the forward end of the rotor R. The inner ends of the shafts 133 are carried by bearings 134 in the journal boss 39, while the outer ends of the shafts are mounted in bearings 135. The bearings 135 are carried in socketed plates or caps 136 secured to the sections 21 and 22 at radial openings in the casing. The bearings 134 and 135 may be of the class shown in Figures 3 and 4. A pinion 137 is formed on the rotor shaft 44 and meshes with gears 138 fixed on the cross shafts 133. It will be observed in Figure 5 that the gears 138 mesh with the pinion 137 at diametrically opposite points to balance the lateral loading while the spiral bevel gearing neutralizes the unbalanced axial thrusts. The gears 138 are of substantial diameter to provide a considerable speed reduction. The transmission further includes a tubular propeller shaft 139 arranged axially in the casing section 22 and carried by spaced anti-friction bearings 140 and 141 retained in the casing section. A gear 142 is formed on the rear end of the shaft 139 and is driven by pinions 143 adjacent the outer ends of the cross shafts 133. The gear 142 is of substantial diameter in relation to the pinions 143 to provide a second stage of speed reduction. The several gears of the transmission are preferably of the spiral bevel type. The transmission is such that in operation the speed of rotation of the rotor pinion 137 may be 120,000 R. P. M., while the rotative speed of the propeller shaft will be 2300 R. P. M., the gear ratios, of course, depending upon the character of the driven part or blading.

The coupling between the shaft 139 and the propeller B may be of any selected type. However, I prefer to employ a curvic face spline connection comprising a flanged insert or block 144 in the forward end of the shaft 139 having an opening for receiving a connection stud and provided with curvic face splines 144' for cooperating with corresponding splines on the propeller hub assembly.

It is a feature of the invention that the power plant is a self-contained unit embodying a fuel injecting system, a lubricating system, and a starting system, together with a simple, manually settable control or governor system. These several elements are directly or intimately associated with the power plant P and are constructed and arranged so that their principal parts are readily removable for servicing, replacement, etc. Many of these parts are incorporated in a housing assembly removably secured to the power plant casing. In Figure 2 I have shown a flat surfaces boss 145 on the lower side of the casing section 22 to form a mounting for this assembly. A motor generator case 146 is engaged against the boss 145 to extend downwardly from the power plant, and contains a motor-generator 213 to be more fully described. The above mentioned fuel supply system 16 includes a blower 147 arranged at the lower side of the motor case 146. The blower 147 is of the Roots type or lobed rotor type, and comprises a housing formed of two end plates 148 separated by an intermediate margin plate 149. The plates 148 and 149 are preferably constructed of a hydraulically pressed graphite and silver combination to make the blower self lubricating. The shaft 150 of the motor generator passes downwardly through the blower housing and a blower rotor 151 is fixed to the shaft. The two lobed rotors 151 of the blower may be identical and carry meshing timing gears 152.

The pump 153 of the lubricating system 15 is arranged below the blower 147 and its housing is made up of two end plates 154 and a marginal spacer or scroll plate 155. The upper end plate 154 is formed to have a chamber 157 containing the timing gears 152 of the blower, and the inlet port 158 of the lubricant pump delivers the oil into this chamber. The lubricating pump further includes a rotor 156 fixed to the shaft 150 and operating within the scroll plate 155. The plate 155 defined a partial scroll chamber for the centrifugal rotor. A carbon seal, or the equivalent, seals about the hub of the rotor 156.

The pump of the fuel supply system is arranged below the lubricant pump 153 and includes a lower housing plate 163 and a scroll plate 164 arranged between the plate 163 and the lower plate 154 of the lubricant pump. The rotor 165 of the fuel pump is fixed to the shaft 150 of the motor generator to operate within the scroll plate 164. Elongate cap screws 162 pass through openings in the motor generator case 146, and through aligned openings in the several plates of the blower 147, the lubricant pump 153 and the fuel pump. The upper end portions of these screws 162 thread into openings in the boss 145 to secure the above described assembly to the power plant casing. Upon unthreading the screws 162, the several elements of the unit just described are detachable and made readily accessible.

The lubricant supply system 15 includes the pump 153 described above which has a discharge port 166 leading through the scroll ring 155 and then downwardly through the plates 163 and 164 of the fuel pump. The blower of the port 166 extends inwardly to the central opening 167 in the lower plate 163 where it terminates in an annular groove in communication with radial ports 169 provided in the motor generator shaft 150. A fluid passage 169 extends upwardly through the shaft 150 from the radial ports, and its upper end discharges into a vertical opening 171 in a stationary trunnion 172 formed on the forward edge of the above mentioned web 38. The lubricant flowing through the shaft 150 serves to cool the armature of the motor-generator. The opening 171 discharges into the boss 39 between the inner ends of the shafts 133 as shown in Figure 5. The lubricant thus supplied to the boss lubricates the bearings 134 of the cross shafts 133. The cross shafts 133 have longitudinal passages 173 for conveying the oil from the interior of the boss 39 to the socketed caps 136 where it lubricates the bearings 135 of the cross shafts.

The above referred to passage 127 in the web 38, and best illustrated in Figure 15, communicates with the passage 171 to receive oil under pressure therefrom, and conducts it to the forward end of the rotor shaft passage 126 to cool the rotor R and lubricate the bearing 43 at the rear end of the rotor as described above. A portion of the oil flowing from the passage 127 to the passage 126 finds its way to the forward bearing 47 of the rotor. A passage 183 is provided in the member 24 and extends from the port 171 to the bearing groove 71 to supply lubricant to the bearings 73 of counter-rotating ring 60 and to flow through the passages 109, 110 and 112 to cool the counter-rotating ring. This lubricant flows into the trough 113 and discharges through a return passage 175 to reach the interior of the casing section 21. The passage or duct 183 extends through the web 38, one of the vanes 36 and the wall 55 to reach the groove 71 which carries the bearing segments of the counter-rotating ring 60.

The lubricating system 15 further includes an oil sump 176 arranged below the power plant at the rear of the auxiliary unit or assembly described in detail above. The sump 176 is preferably a dural casting provided on its external surfaces with deep heat radiating ribs 177. An internal web 178 is provided in the sump 176, and the upper side of the sump has a flat boss or face engaging the under side of the block 180. The block 180 in turn bears upwardly against a horizontal face on the lower end of the above mentioned web 40. Studs or cap screws 181 pass upwardly through vertical openings in the sump 176 and its web 178 and continue upwardly through openings in the block 180 to thread into openings in the lower end of the web 40, thus securing the sump and the block to the power plant case. Horizontal cap screws 260 extend rearwardly through openings in the lower plate 163 and an upper plate or casing section of the above described auxiliary assembly, and thread into openings in the forward flange or boss 261 of the sump to clamp the boss and said assembly in tight engagement.

As above mentioned, the hot lubricant from the rotor cooling passage 129 flows through the collector passage 130 to the oil return port 131. This return port 131 passes downwardly through the journal block 41 and continues downwardly through the web 40 and block 180 to the sump 176 where it communicates with a cooling passage 185. The cooling passage 185 preferably comprises several convolutions in the side wall of the ribbed sump and terminates in a discharge which empties into the sump; see Figure 9. The passage 185 may be provided by casting a suitable coil of copper tubing, or the like, in the sump casting. A lubricant return or drain duct 186 leads from the lower portion of the casing section 21 to the sump 176 to return the oil from the interior of the casing to the sump. The passage 185 arranged as just described brings the returning hot oil in close proximity to the heat dissipating ribs 261, and in the event the oil level in the sump becomes low, there is still ample heat dissipation by the ribs 177 adjacent the convolute passage 185.

The fuel supply system 16 includes the blower 147 described above. It is preferred to bleed compressed air from the compressor means 10 of the power plant to the inlet side of the blower 147 so that a double stage of compression is obtained for the injection air supplied to the ring 94 of the fuel injecting manifold. A duct 187 extends from the outlet passage 64 or 82 of the compressor means 10 and passes through the web 178 of the sump to the inlet of the blower 147. The air passing through that portion of the duct 187, which is in the web 178, is in heat absorbing or heat transfer relation to the heated oil of the sump whereby the air is heated during its passage to the blower. A duct 188 returns back through the web 178 of the sump to the block 180 so that the compressed air is again heated before delivery to the manifold ring 94. A shuttle valve 190 is interposed between the duct 188 and the above mentioned passage 95, which finally conducts the air to the injection ring 94. The valve 190 as shown in Figure 10 is a cylindrical part slidably arranged in a horizontal opening in the block 180. An annular external groove 191 is provided in the valve 190 and in the open position of the valve, communicates with the two passages 188 and 95 to connect the same. It will be seen that during operation of the power plant the fuel injecting air is compressed by the compressor means 10, is preheated during its passage to the blower 47, is compressed by the blower 47, and is again heated before delivery to the manifold injecting ring 94.

A fuel supply line 192 leads from a suitable fuel supply now shown, to the intake of the fuel pump, and a duct 193 extends from the high pressure side of the pump through the sump web 178 and the block 180 to the valve 190. The fuel absorbs heat during its passage through that portion of the duct 193 which extends through the web 178. The valve 190 is interposed between the duct 193 extending from the fuel pump and the above referred to passage 95 which conveys the fuel under pressure to the injecting ring 93. The valve 190 is provided with an external annular groove 194, which communicates with the duct 193 and the passage 96 to allow the free flow of the fuel to the injecting ring 193 when the valve is in its open position.

The starting means 17 is operable to prelubricate the various power plant bearings, raise the fuel pressure, and spout or jet a stream of combustion gases against the buckets 102 of the counter-rotating ring 60 to drive the ring and thus develop sufficient air pressure in the plant for starting. The sequence control to be later described provides for the diversion of fuel and air pressure to the injecting rings 93 and 94 for the starting and continued power plant operation. The starting means includes a tank 195 positioned within the inner wall 120 of the heat exchanger 11; see Figure 6. The tank 195 may be attached to the web 40 and extends rearwardly therefrom in spaced relation to the wall 120 of the heat exchanger 11 to leave the annular cooling air passage 122' described above. The rear end of the tank may be provided with a faired or rearwardly convergent cap 196. A single passage 197 extends through the web 40 and block 180 from the interior of the tank 195 to the valve 190, as shown schematically in Figure 10. A second passage or duct 198 is provided to extend from the valve to a nozzle 199 formed and arranged to spout against the buckets 102 of the counter-rotating ring 60. The nozzle 199 is of the De Laval type, and extends forwardly through the above mentioned cooling air passage 125 to project forwardly from the wall 89. As illustrated in Figure 10, an end portion of the valve 190 controls communication between the passages 197 and 198. The valve 190 is biased by a spring 262 to the closed position illustrated in Figure 10 where it closes off communication between the passages 197 and 198.

The starting means 17 provides for the delivery of compressed air and fuel to the starting tank 195 and for the ignition of the fuel and air mixture therein to create a substantial volume of combustion gases under pressure which are discharged from the nozzle 199 to initiate turbine operation. A branch passage 200 in the web 40 extends from the air pressure passage 188 to the tank passage 197. This branch passage is controlled by the valve 190, the valve having a diametric port 201 which completes the passage 200 when the valve is in the position of Figure 10, the passage 200 being closed when the valve is in its normal open position. The fuel passage 193 has a branch 263 extending to the valve 190 where it communicates with an annular external groove 202 when the valve is in the position illustrated in Figure 10. An axial port 203 extends through the valve 190 from the groove 202 to the above mentioned diametric air pressure port 201. This arrangement provides for the delivery of the fuel to the air port 201, and the air passing through that port shears off the fuel stream to break up the fuel and assure the delivery of an effective fuel and air mixture to the starting tank 195.

The starting means 17 further includes an ignition system for igniting the fuel and air mixture in the tank 195. A glow plug or igniting plug 204 is arranged in the block 180 to have its resistance glow wire exposed in the starter tank passage 197. The plug 204 in this location is readily accessible and is not subjected to the high temperatures generated in the combustion chamber. A lead 205 extends from one terminal of the plug 204 to a storage battery 206, and a lead 207 extends from the other terminal of the plug to a pressure sensitive switch 208. The pressure operated switch 208 may be of the diaphragm or bellows type, and its pressure chamber has communication with the duct 187 leading from the discharge passage 64 of the compressor means 10. Figure 10 diagrammatically illustrates a branch line 269 extending from the duct 187 to the pressure operated switch to subject the same to the pressure in the passage 64 of the compressor means 10. The switch embodies a movable contactor controlled by the pressure sensitive bellows and two spaced stationary contacts 210 and 211 engaged by the contactor in its two positions. The lead 207 from the ignition plug 204 connects with the contact 210, and the contactor remains in engagement with this contact until a predetermined pressure is built up by the compressor means 10. A conductor 212 extends from the contactor of the pressure responsive switch 208 to a master switch 413, and thence to the battery 206. When the master switch 413 is closed, a circuit is completed to the ignition plug 204 through the leads 205 and 207, the pressure switch 208 and the lead 212. The ignition plug 204 is designed to ignite the rich fuel and air mixture in the tank 195 a predetermined time subsequent to closing of the master switch 413. For example, the plug 204 may be constructed to cause ignition of the mixture ten or twelve seconds after closing of the master switch.

Provision is made for automatically shifting the valve 190 from the position of Figure 10 to the open position upon igniting the fuel and air mixture in the starting tank 195. The valve 190 is stepped or graduated in diameter to have an axially facing annular piston surface or shoulder 264. The starter tank passage 197 or the end portion of the passage 200 communicating therewith, has a branch port 265 for delivering pressure to the piston shoulder 264 of the valve. The above described spring 262 initially holds the valve 190 in the position of Figure 10 where the passage 198 is closed. Upon igniting of the fuel and air mixture in the starting tank 195 and its passage 197, the resultant pressure is conveyed through the port 265 to act against the shoulder 264, and the pressure thus applied suddenly reverses the valve 190. When the valve 190 is thus reversed, the gases of combustion are free to flow through the passage 198 to the nozzle 199 and the passages 195 and 196 of the fuel injecting system are opened to receive the air and fuel under pressure for power plant operation. The shifting or reversal of the valve 190 also closes the starting fuel and air passages 263 and 200.

Releasable means is provided to hold the valve 190 in the open position where fuel and air under pressure are delivered to the injecting rings 93 and 94. This means may comprise a spring urged detent 266 for cooperating with a notch 267 in the valve 190. When the valve 190 is moved to the open position by the gas pressure acting upon its shoulder 264, the detent 266 snaps into the notch 267. The engagement of the detent 266 in the notch 267 assisted by the pressure in the combustion chamber 11 acting upon the reduced end of the valve 190 and conveyed thereto by the nozzle 199 and the passages 198 and 265, holds the valve in the open position. The combined effect of the detent 266 and the combustion chamber pressure acting on the valve 90 overcomes the spring 262. However, when the pressure in the combustion chamber falls to a given value at the termination of power plant operation, the spring 262 overcomes the detent 266 and restores the valve 190 to the position of Figure 10 and thus conditions the power plant for restarting. From this it will be seen that the shuttle valve 190 and the associated parts are governed by the pressures generated in the starting tank 195 and the combustion chamber 11 to provide for the power plant starting and stopping sequence.

The motor-generator 213 housed in the above mentioned case 146 serves to drive the blower 147, the lubricant pump 153 and the fuel pump, during the starting cycle, to prelubricate the several bearings of the power plant and to supply the mixture of fuel and air under pressure to the starting tank 195. The motor-generator, as diagrammatically illustrated in Figure 10 of the drawings, includes a series field coil 214 and a shunt field coil 215. A conductor 217 extends from the above mentioned lead 212 to terminals of the coils 214 and 215 and thence to the solenoid 218 of a voltage regulator 219 associated with the generator. A shunt or cut-out line 268 connects the series field coil 214 with the contact 211 of the pressure control switch 208 so that the coil is shorted out when idling speed of the power plant is approached or attained. The shunt field coil 215 has one terminal connected to a carbon pile 220 and a tap 221' connects the other end of the carbon pile and one side of the solenoid 218 with the battery lead 205; the other side of the solenoid being connected in the line 217. The carbon pile 220 is varied or controlled by a spring urged plunger 221, and the latter is adapted to be acted upon by the solenoid 218.

It will be seen that the motor-generator 213 is circuited to serve as a motor when the contactor of the pressure-sensitive switch 208 is in engagement with the contact 210 and is circuited to serve as a generator when the contactor of switch 208 is in engagement with the contact 211.

A releasable or overrunning drive is provided between the motor-generator 213 and the transmission of the power plant rotor R so that the motor-generator is driven by the power plant to operate as a generator during power plant operation. The overrunning drive includes a pinion 222 freely rotatable on the stationary trunnion 172 and meshing with the gear 142; see Figure 2.

The pinion 222 is suported by the trunnion and a bearing 223 carried by the above mentioned boss 145 of the power plant case. The shaft 150 of the motor-generator has its upper end portion supported by a bearing 224 in the case 146, and a plug 225 is arranged in the lower end of the pinion 222 to oppose the end of the shaft. The opposing ends of the shaft 150 and plug 225 have cooperable clutch teeth 226. Spiral splines 227 are provided on the plug 225 and the interior of the pinion 222, and cooperate to feed the plug downwardly and thus engage the clutch teeth 226 when the pinion 222 is driven by the power plant to rotate with respect to the shaft 150 of the motor-generator. Thus when the power plant is in operation the motor-generator is driven to supply current to the battery circuit. When the motor-generator is operating as a motor, the clutch teeth force the plug 225 upwardly to disengage the teeth.

Provision is made for manual operation of the blower 147, oil pump 153 and fuel pump for the purpose of starting the power plant in the event the battery 206 is dead or weak. This means includes a conveniently located hand crank 230 for driving a flexible cable 231 through the medium of a gear train 232. The cable 231 extends to the lower end of the shaft 150 where it is provided with a socket member 233. As illustrated in Figure 2, the socket member is rotatably supported in a bearing cap 234 and is sealed about in the lower plate 163. A plug 235 is arranged in the socket member, and the member and plug have cooperating spiral splines 236 operable to produce axial movement of the plug. The opposing ends of the shaft 150 and plug 235 have overrunning clutch teeth 237. The teeth 237 and the spiral splines 236 are constructed and related so that during rotation of the shaft 150 by the power plant, or by the motor generator 213, the teeth 237 are disengaged. However, when the member 233 is rotated by operation of the hand crank 230, the splines 236 feed the teeth of the plug 235 into engagement with the teeth of the shaft 150 so that the blower 147, the fuel pump and the lubricant pump 153 are manually operated, through the drive just described, to condition the power plant for starting. It is to be understood that the manual starting means just described is primarily an emergency device to be employed when the battery is dead.

The speed governing means 18 of the invention provides for substantially constant operating speed of the power plant at any one of a plurality of selected manual settings of a manual throttle or control lever 240. The discharge pressure characteristic of the lubricant pump or the fuel pump is utilized as the control factor of the speed governing means. In the preferred arrangement illustrated, the discharge pressure characteristic of the fuel pump is employed as the speed governing factor. The fuel pump when employed in this manner, has a centrifugal impeller 165 provided with vanes which lean forwardly relative to its direction of rotation. A speed governing valve or throttle valve 241 is interposed in the discharge passage 193 leading from the fuel pump. This valve is a discharge pressure operated, manually settable valve, including a piston 242 operating in a cylinder having a branch port 243 which carries the discharge pressure of the fuel pump to act upon the piston. A needle or stem 244 on the piston 242 cooperates with a seat or angular portion of the fuel passage 193 to control the flow of fuel to the injecting means. A lever 246 is operated by the above mentioned throttle lever 240 through the medium of a suitable linkage 247 and a compression spring 248 is arranged between an arm of the lever 246 and the rear side of the piston 242. With this construction, movement of the throttle lever 240 adjusts or varies the spring tension or pressure opposing the discharge pressure acting upon the piston 242. When a fuel pump of the character above described is employed it has a slightly rising pressure characteristic with an increase in flow, but the pump curve is substantially flat. The fuel pump discharge pressure varies substantially in accordance with the square of the turbine speed, regardless of the fuel flow rate change accompanying altitude variations. Therefore, when the throttle lever 240 is set to a given position, at 50% of full speed for example, the spring pressure against the discharge pressure operated piston is adjusted to obtain a substantially constant speed which is practically unaffected by altitude variations, propeller loading and other external conditions. However, the speed will increase slightly with an increase in altitude of the aircraft. The output of the fuel pump and the air pressure conditions in the combustion chamber of the power plant are related so that the fuel flow does not exceed a value where the substantially flat curve characteristics of the pump no longer prevail. As illustrated in Figure 10 of the drawings, the throttle lever 240 may have several predetermined and calibrated settings such as "Off," "Idle," "50% RPM" and "100% RPM." When the throttle lever 240 is in the "Off" position, the stem 244 completely closes the fuel duct 193, and when the lever is in the "Start" or "Idle" position, the valve is cracked or only slightly opened to allow the delivery of fuel sufficient for starting and idling of the power plant.

The above mentioned master switch 413 is preferably associated with the manual throttle so that only a single manual operating member is required to start, stop and control the power plant. In Figure 10 I have shown a lever 270 connected to the linkage 247 for operating the master switch 413. The arrangement is such that the switch 413 is opened when the lever 240 is in the "Off" position, and closed when the lever is in the other positions.

A drain 275 communicates with the combustion chamber 11 and the cooling air passage 91, and extends to the atmosphere. The drain 275 serves to carry away excessive fuel in the event the combustion chamber 11 becomes flooded during starting of the power plant.

*Operation*

To start the power plant, the control or throttle lever 240 is moved to the "Start" or "Idle" position. This closes the master switch 413 to energize the motor generator 213 and to supply current to the igniting plug 204. The motor generator energized by the battery 206 drives the blower 147 to supply air under pressure to the starting tank 195, drives the fuel pump to raise the fuel pressure and supply fuel to the starter tank 195, and drives the lubricant pump 153 to raise the lubricant pressure and prelubricate the various power plant bearings. At this time the valve 190 is in the position of Figure 10, and the air pressure flows through the branch duct 200 and the port 201 to the starting tank and fuel is supplied through the branch passage 263 and the valve port 203 to the starter tank. At the end of a predetermined limited period established by the design or setting of the glow plug 204, the plug ignites the rich fuel and air mixture in the starter tank 195. Ignition of the fuel and air mixture results in the generation of sufficient pressure in the tank and the passages 197 and 265 to drive the valve 190 to its open position against the action of the spring 262. The starter valve 190 is subsequently retained in the open position by the detent 266 and by the combustion chamber pressures acting on its exposed end as above described. Opening of the starter valve 190 allows the combustion gases under pressure to flow from the starter tank 195 through the passage 198 to spout from the nozzle 199. The gases thus discharged by the nozzle 199 impinge against the buckets 102 of the counter-rotating ring 60 to spin the ring.

Opening of the starter valve 190 also diverts the air pressure from the blower 147 to the injection ring 94 and diverts the fuel under pressure from the fuel pump to the ring 93. The fuel and air mixture thus introduced into the combustion chamber 12 ignites in the chamber. The plant accelerates to idling speed by reason of the combustion gases from the chamber 12 driving the turbine 13, which in turn, drives the compressor means 10. Operation of the compressor means 10 increases the air pressure at the discharge passage 64 of the compressor. When the pressure in the passage 64 reaches a given value, the contactor of the pressure sensitive switch 208 moves from the contact 210 to the contact 211 to de-energize the glow plug 204 and to disconnect the motor-generator 213 from the battery 206. When the pinion 225 is driven by the power plant relative to the motor-generator shaft 150, the overrunning clutch teeth 226 engage so that the motor-generator is driven by the power plant to supply current to the battery circuit under the control of the voltage regulator 219. When the throttle or control lever 240 is moved to a position to put the power plant on a power producing basis, the motor-generator becomes an effective electrical generator.

It is to be particularly noted that the starting sequence is automatic, and for normal starting it is only necessary to move the lever 240 to the starting position. In the event the power plant fails to start, the lever 240 may be restored to the "Off" position and then again move to the starting position where the above described operations are repeated.

The present invention provides a constant pressure gas turbine power plant of small size that has an efficiency comparable with the best efficiencies of small reciprocating gasoline engines, and that produces more horsepower per unit of weight than reciprocating engines. The power plant of this invention has fewer parts, is more compact, and has a longer life than reciprocating engines, and is perfectly balanced and substantially vibrationless. Furthermore, the power plant is well adapted for mass production methods of fabrication and its integrated accessories facilitate assembly and servicing.

Having described only a typical form of the invention, I do not wish to be limited to the specific details herein set forth, but wish to reserve to myself any variations or modifications that may appear to those skilled in the art or fall within the scope of the following claims.

I claim:

1. In an internal combustion gas turbine power plant, a rotor carrying compressor impeller blading and turbine blading, stationary diffuser blading spaced around the impeller blading, a rotatable ring surrounding the impeller blading of the rotor and having diffuser blading between said impeller blading and said stationary diffuser blading, a combustion chamber receiving the air compressed by said blading and supplying combustion gases to the turbine blading to drive the rotor, and buckets on said ring acted upon by said gases to rotate the ring counter to the direction of rotation of the rotor.

2. In an internal combustion gas turbine, a rotor, compressor means comprising impeller blading on the rotor, a rotatable ring surrounding the impeller blading of the rotor, diffuser blading on the ring in cooperative relation to the impeller blading, turbine means comprising a casing around the rotor defining an expansion zone, and buckets on the rotor operating in said zone, a combustion chamber receiving the compressed air from the compressor means and having a constricted outlet discharging combustion gases into the expansion zone, and blading on said ring extending into said outlet and acted upon by said gases to rotate said ring in a direction counter to the direction of rotation of the rotor.

3. In an internal combustion gas turbine, a rotor, compressor means comprising impeller blading on the rotor, turbine means comprising buckets on the rotor, a combustion chamber surrounding the turbine means and discharging combustion gases into the turbine means, and an annular heat exchanger in coaxial relation with the rotor and in axial alignment with the combustion chamber receiving the exhaust gases from the turbine means and conducting compressed air from the compressor means to the combustion chamber.

4. In an internal combustion gas turbine, a rotor, compressor means comprising impeller blading on the rotor, turbine means including buckets on the rotor, a combustion chamber in spaced surrounding relation to the turbine means for discharging combustion gases into the turbine means, the combustion chamber including a substantially annular wall spaced around the turbine means to leave a cooling chamber between the turbine means and combustion chamber, a substantially annular baffle spaced within said wall in generally concentric relation thereto to therewith define a cooling passage, the forward end of the passage having communication with the cooling chamber, and means for conducting compressed air from the compressor means to the rear ends of the combustion chamber and cooling chamber to flow forwardly through both chambers, said cooling passage conducting the air rearwardly out of the cooling chamber.

5. In an internal combustion gas turbine power plant, a rotor, compressor means, turbine means including a casing spaced around the rotor to define an expansion zone, buckets on the rotor operating in the expansion zone, a combustion chamber in spaced surrounding relation to said casing to leave a cooling air chamber therebetween and having an outlet discharging substantially radially into said expansion zone, a heat exchanger receiving the exhaust gases from the turbine means, means for conducting the compressed air from the compressor means to the heat exchanger for passage therethrough to the combustion chamber, and conduit means for diverting a portion of said air past the heat exchanger and to said cooling air chamber for circulation therethrough.

6. In an internal combustion gas turbine power plant, a rotor, compressor means including impeller blading on the rotor, turbine means including a casing spaced around a portion of the rotor to define an expansion zone, buckets on said portion of the rotor operating in the expansion zone, a combustion chamber around said casing having an outlet discharging substantially radially into the expansion zone, an elongate tubular heat exchanger arranged at the rear of the combustion chamber and in substantially axial alignment therewith for receiving the exhaust gases from the turbine means and including air tubes discharging forwardly into the combustion chamber, and a channel passing rearwardly around the combustion chamber for conducting compressed air from the compressor means to the rear ends of said tubes for flow therethrough to the combustion chamber.

7. In an internal combustion gas turbine power plant, a rotor having a portion of enlarged external diameter intermediate its ends, the opposite sides of said portion being curved radially and axially, compressor means including impeller blades projecting from one side of said rotor portion curved both axially and radially with respect to the rotor, turbine means including turbine blading projecting from the other side of said rotor portion curved both axially and radially thereof, and a combustion chamber receiving compressed air from the compressor means and discharging combustion gases substantially radially into the turbine means.

8. In an internal combustion gas turbine power plant; a compressor-turbo rotor having a portion of increased external diameter presenting opposite side surfaces, compressor impeller blades projecting substantially axially in one direction from one side surface of said portion and curved both axially and radially of the rotor, and turbine blading projecting substantially axially in the other direction from the other side surface of said portion and curved both axially and radially of the rotor.

9. In an internal combustion gas turbine power plant, a compressor-turbo rotor having a portion of increased external diameter, compressor means including compressor blading projecting from one side of said portion, turbine means including an expansion zone and blading projecting from the other side of said portion operating in said expansion zone, a combustion chamber receiving the compressed air from said compressor means and discharging combustion gases into said expansion zone, and sealing means at the periphery of said rotor portion between the compressor means and the discharge portion of the combustion chamber.

10. In an internal combustion gas turbine power plant, a compressor-turbo rotor having a portion of increased external diameter having opposite side surfaces, compressor means including compressor blading projecting from one side surface of said portion, turbine means including an expansion zone and blading projecting from the other side surface of said portion operating in said expansion zone, a combustion chamber having an exit discharging combustion gases into the expansion zone at said other side of said rotor portion, channel means for conducting compressed air from the compressor means to the combustion chamber, and sealing means at the periphery of said rotor portion between the compressor means and the discharge portion of the combustion chamber.

11. In an internal combustion gas turbine, an expansion zone, a combustion chamber for supplying gases of combustion to the expansion zone, a compressor casing, a rotor, turbine blading on the rotor operating in the expansion zone, compressor blading on the rotor operating in said casing, a rotatable ring having diffuser blading in surrounding relation to said compressor blading, means for conducting the compressed air from the diffuser blading to the combustion chamber, buckets on the ring positioned to be acted upon by the gases of combustion entering the expansion zone to rotate the ring counter to the direction of rotation of the rotor, the ring having internal coolant ducts, and means for circulating coolant through the ducts.

12. In an internal combustion turbine, an axial flow turbine, a combustion chamber for supplying combustion gases to the turbine, compressor means driven by the turbine for supplying compressed air to the combustion chamber and a heat exchanger comprising an annular casing extending rearwardly from the turbine and receiving the exhaust gases therefrom, an annular conduit carrying the compressed air from the compressor means and extending rearwardly therefrom in surrounding relation to said casing, and tubes extending axially through said casing to conduct the air to the combustion chamber and having rear portions curved outwardly to receive the compressed air from said conduit and having their forward ends discharging into the combustion chamber.

13. In an internal combustion turbine plant, a combustion chamber, an expansion zone for receiving the combustion gases from said chamber and having an entrance in communication with said chamber, a turbine rotor having impulse blading operating in said chamber, a rotatable turbo-compressor ring surrounding the rotor, and a row of pure reaction blades projecting axially from the ring at the entrance of said chamber acted upon by said gases to rotate the ring counter to the direction of rotation of the rotor.

14. In an internal combustion turbine power plant; turbine means, compressor means operated by the turbine means, a combustion chamber connected between the compressor means and the inlet of the turbine means and surrounding the turbine means in spaced relation thereto to leave a cooling space, shrouds spaced from the inner and outer walls of the combustion chamber to therewith define cooling air passages in communication with said space, and means for directing air from the compressor means to said space for flow through said space and said passages.

15. In a gas turbine power plant, a rotor, a compressor housing section around a portion of the rotor, compressor blading on the rotor operating in the housing, a counter-rotating ring surrounding a portion of the rotor and carrying second stage compressor blading, a sectional annular member between the rotor and ring urged outwardly against the ring by centrifugal force, an axial face on the rotor, sealing means on the member for sealing with said face, a combustion chamber receiving compressed air from said blading, and turbine blading on another portion of the rotor and on said ring acted upon by the gases of combustion from said chamber to drive the rotor and ring in opposite directions.

NATHAN C. PRICE.

(References on following page)

REFERENCES CITED

The following references are of record in the file of this patent:

UNITED STATES PATENTS

| Number | Name | Date |
|---|---|---|
| 1,035,240 | Rumberg | Aug. 13, 1912 |
| 1,192,227 | Rendano | July 25, 1916 |
| 1,207,591 | Melrose | Dec. 5, 1916 |
| 1,838,477 | Elsea | Dec. 29, 1931 |
| 1,972,377 | Laderriere | Sept. 4, 1934 |
| 2,056,198 | Lasley | Oct. 6, 1936 |
| 2,058,479 | Lysholm | Oct. 27, 1936 |
| 2,112,672 | Lasley | Mar. 29, 1938 |
| 2,195,025 | Couzinet | Mar. 26, 1940 |
| 2,242,767 | Traupel | May 20, 1941 |
| 2,243,467 | Jendrassik | May 27, 1941 |
| 2,244,467 | Lysholm | June 3, 1941 |
| 2,258,792 | New | Oct. 14, 1941 |
| 2,262,195 | Noack | Nov. 11, 1941 |
| 2,269,181 | Clark | Jan. 6, 1942 |
| 2,322,824 | Buchi | June 29, 1943 |
| 2,326,072 | Seippel | Aug. 3, 1943 |
| 2,358,301 | Brauns | Sept. 19, 1944 |
| 2,394,353 | Zellbeck | Feb. 5, 1946 |
| 2,399,046 | Larrecq | Apr. 23, 1946 |
| 2,400,714 | Rowledge | May 21, 1946 |
| 2,402,377 | Davenport | June 18, 1946 |
| 2,402,467 | Thompson | June 18, 1946 |
| 2,407,115 | Udale | Sept. 3, 1946 |
| 2,430,399 | Heppner | Nov. 4, 1947 |
| 2,435,042 | Johansson | Jan. 27, 1948 |
| 2,435,138 | Heppner | Jan. 27, 1948 |
| 2,473,356 | Birmann | June 14, 1949 |